May 30, 1939.  J. A. LOGAN ET AL  2,160,386
LIQUID DISPENSING APPARATUS
Original Filed Sept. 5, 1935   5 Sheets-Sheet 2
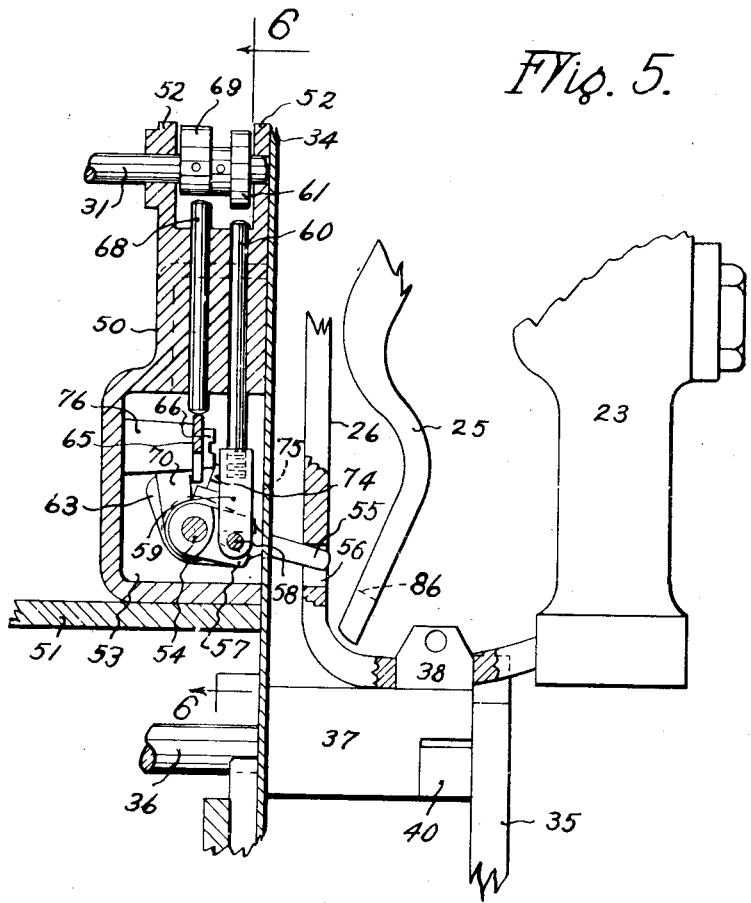
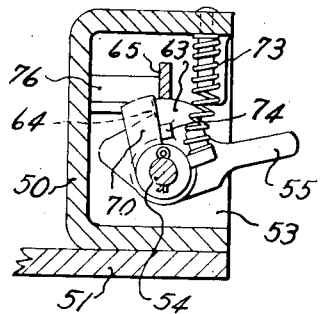
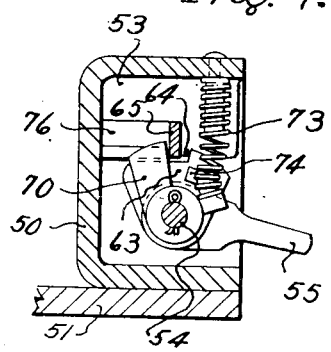
INVENTOR
Joseph A. Logan And
BY Warren H. DeLancey
Chapin + Neal
ATTORNEYS May 30, 1939.  J. A. LOGAN ET AL  2,160,386
LIQUID DISPENSING APPARATUS
Original Filed Sept. 5, 1935  5 Sheets-Sheet 3

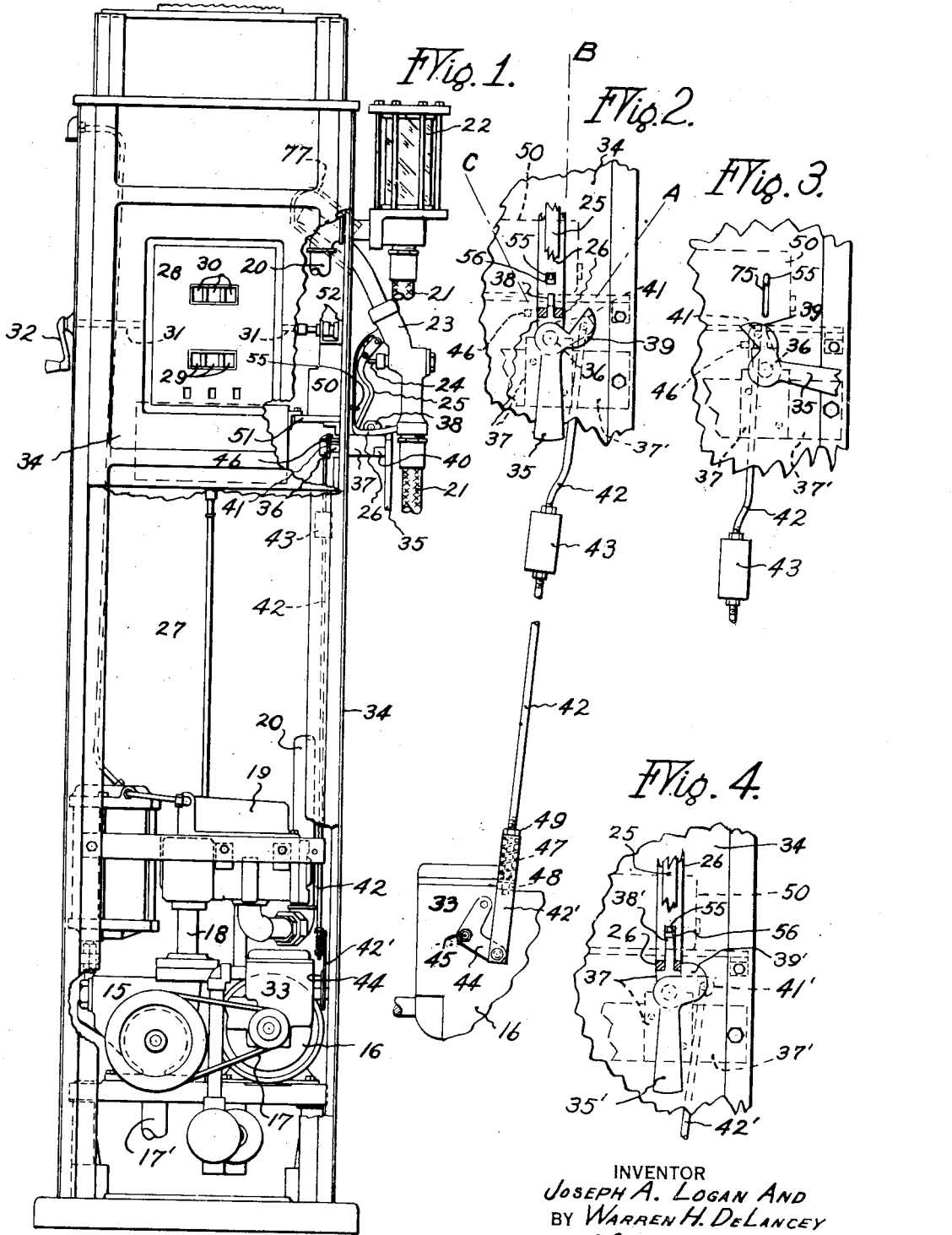

INVENTOR
JOSEPH A. LOGAN AND
BY WARREN H. DE LANCEY
Chapin + Neal
ATTORNEYS

May 30, 1939.　　J. A. LOGAN ET AL　　2,160,386
LIQUID DISPENSING APPARATUS
Original Filed Sept. 5, 1935　　5 Sheets-Sheet 4
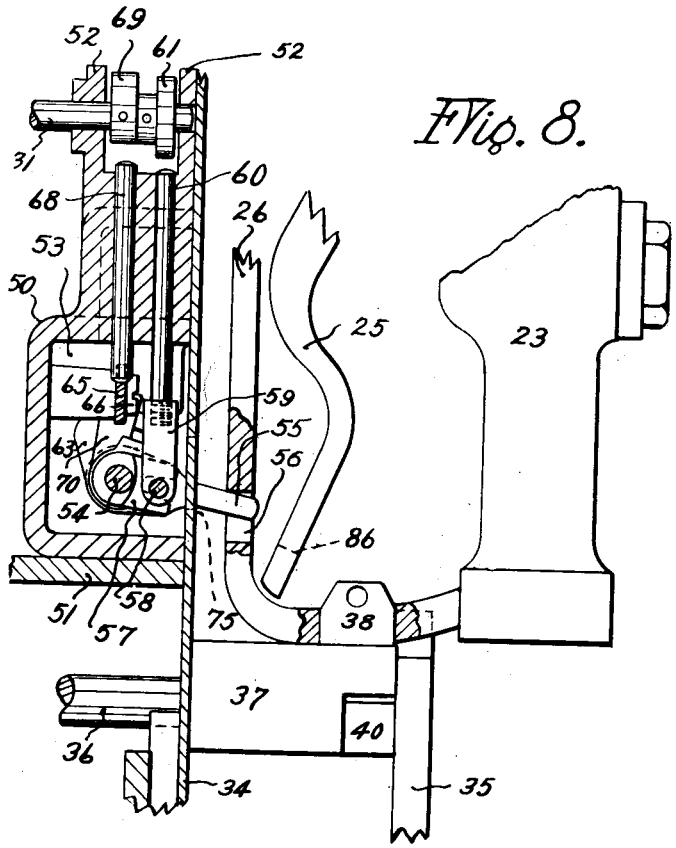
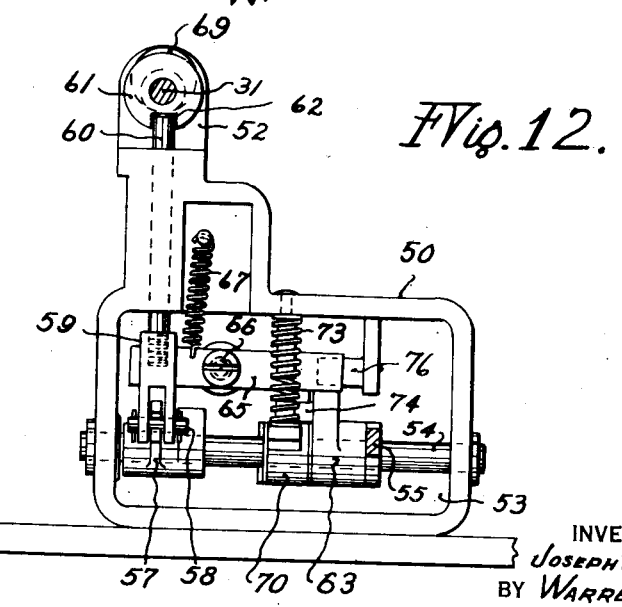
INVENTOR
Joseph A. Logan And
BY Warren H. DeLancey
Chapin + Neal
ATTORNEYS May 30, 1939.  J. A. LOGAN ET AL  2,160,386
LIQUID DISPENSING APPARATUS
Original Filed Sept. 5, 1935   5 Sheets-Sheet 5
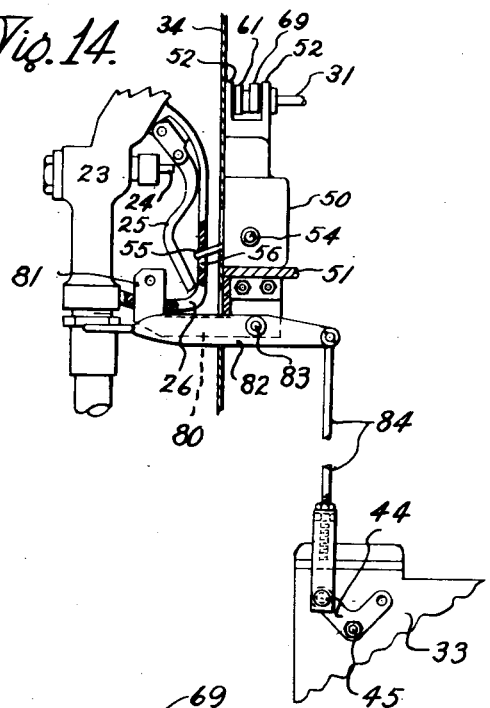
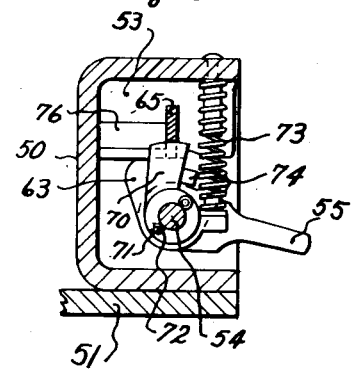
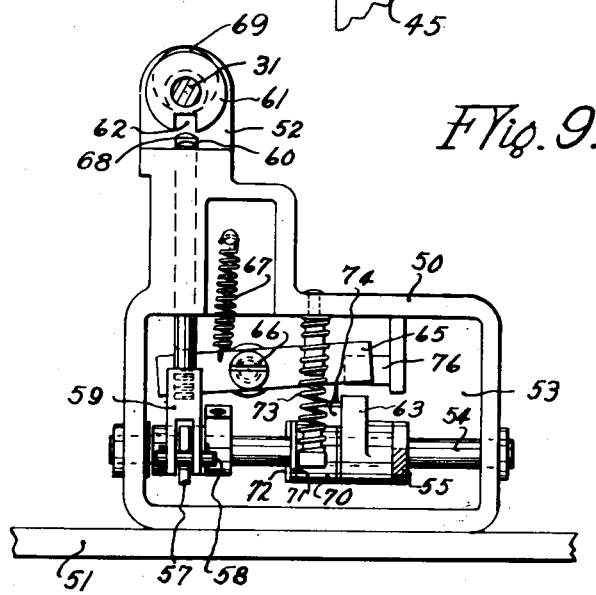
INVENTOR
JOSEPH A. LOGAN AND
BY WARREN H. DELANCEY
Chapin + Neal
ATTORNEYS Patented May 30, 1939

2,160,386

UNITED STATES PATENT OFFICE 2,160,386

LIQUID DISPENSING APPARATUS

Joseph A. Logan, Springfield, and Warren H. De Lancey, West Springfield, Mass., assignors to Gilbert & Barker Manufacturing Company, West Springfield, Mass., a corporation of Massachusetts Application September 5, 1935, Serial No. 39,222
Renewed September 3, 1937

14 Claims. (Cl. 221—95)

This invention relates to improvements in liquid dispensing apparatus, such for example as that commonly used for dispensing measured quantities of gasoline, oil, and the like.

More particularly, the invention relates to a species of protective mechanism designed to prevent delivery of liquid to the customer unless and until the register, which indicates the quantities of liquid dispensed, has been reset to zero.

The object of this invention is to accomplish the above broad purpose in a manner which will enable operation of the pump, or other means used to force the gasoline through the meter, and yet make it certain that no gasoline can be delivered to the tank of the customer's car until the register has been reset.

It frequently happens that the visible discharge indicator is not completely filled, as it should be, at the start of a dispensing operation. For various reasons, the level of liquid in such indicator may drop, particularly if considerable time elapses between dispensing operations. With apparatus of the now-prevalent form, the pump cannot be started until the register has been reset to zero. Then, if the visible discharge indicator needs replenishment, the quantity pumped for this purpose will be shown on the register and, being usually a small quantity, the customer may not notice it and the operator may not bother to reset the register to zero before starting delivery to the customer. The result will be that the customer will get less than is indicated on the register and less than he pays for. It is better then to allow operation of the pump, previous to resetting the register, for the purpose of replenishing the visible discharge indicator and then, after the latter is properly filled, to reset the register and clear it of the quantity indicated thereon, which quantity is the sum of the quantity used for replenishing the visible discharge indicator and the quantity dispensed on the previous sale.

This invention has for an object to provide means for locking the hose nozzle to its support so that it cannot be removed and placed in the tank of a customer's car unless and until the register has first been reset to zero and at the same time to allow the flow-control means to be operated (preferably only when the operator is near the pump and in a manner requiring his constant attention) while the nozzle is locked up on its support.

Other objects and advantages will appear as the detailed description proceeds and will be pointed out in the appended claims.

The invention will be disclosed with reference to the accompanying drawings, in which:

Fig. 1 is a front elevational view of a liquid dispensing apparatus embodying the invention,—parts of the housing being broken away to reveal interior parts;

Fig. 2 is a fragmentary side elevational view taken from the right-hand side of Fig. 1,—the housing being broken away to reveal the switch and the switch operating connections;

Fig. 3 is a fragmentary view taken similarly to Fig. 2 but showing the movable parts in different positions;

Fig. 4 is a view taken similarly to Fig. 3 and showing a different form of switch operating lever;

Fig. 5 is a fragmentary sectional elevational view showing the hose nozzle support and the locking means therefor,—the parts being shown in nozzle locking position;

Fig. 7 is a cross-sectional view taken on the line 7—7 of Fig. 6;

Figure 11:
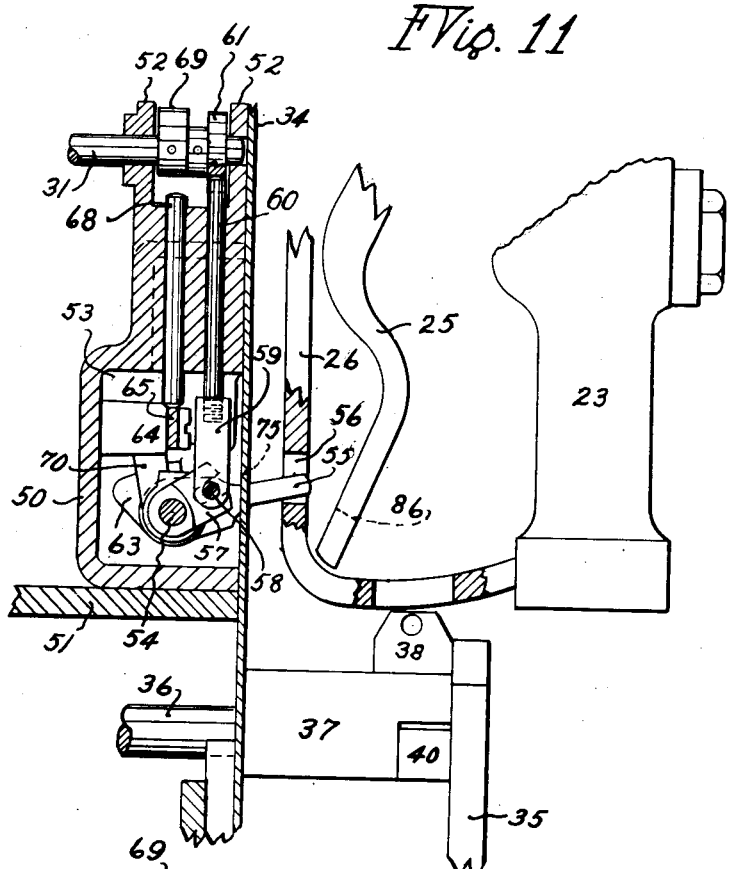
Figure 6:
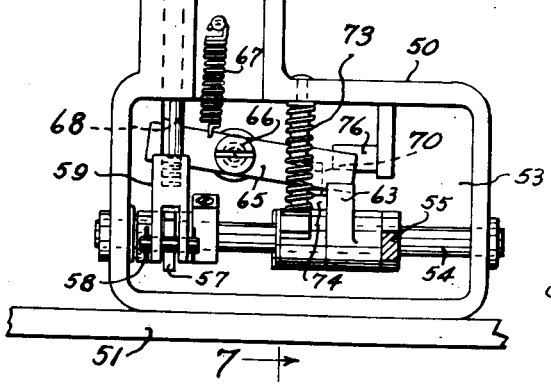
Fig. 6 is a view taken on the line 6—6 of Fig. 5.

Figs. 8 and 9 and 10 are views taken similarly to Figs. 5, 6 and 7 respectively, but showing the parts in the positions which they assume when the hose nozzle is unlocked and free for removal from its support;

Figs. 11, 12, and 13 are views taken similarly to Figs. 5, 6 and 7, respectively, but showing the parts in the positions which they assume after the hose nozzle has been unlocked and moved into position to be removed from its support; and Fig. 14 is a fragmentary view illustrative of a third form of switch operating lever.

Referring to these drawings and particularly to Fig. 1 thereof, the apparatus includes a suitable pump 15, driven by an electric motor 16 by the belt 17. This pump draws gasoline up through a suction pipe 17' from an underground supply tank (not shown) and forces such gasoline upwardly through a pipe 18 to a suitable meter 19. A discharge pipe 20 leads upwardly to a suitable elevation and has connected thereto one end of a flexible hose 21. Usually a visible discharge indicator, such as 22, is interposed between the pipe 20 and hose 21. The other end of the hose carries a nozzle 23 of the usual type having within it a self-closing valve which has a stem 24 extending out of the nozzle casing for operation by a hand lever 25. As shown, the nozzle valve is closed, but when lever 25 is moved toward the nozzle casing the valve will be opened. A guard 26, fixed to the nozzle casing, is provided for lever 25. The meter 19 drives through a shaft 27 a suitable register 28 for indicating the measured quantities dispensed. In this case, the register 28 is of the computing type and has a set of dial wheels 29 for indicating the quantity dispensed and another set of dial wheels 30 for indicating the cost of such quantity. The register includes suitable means for resetting the dial wheels to zero and such means are operable by turning a shaft 31,—a hand crank 32 being provided for this purpose. The motor 16 is provided with a suitable switch contained in a casing 33. The apparatus thus described is enclosed except for the hose 21, indicator 22, nozzle 23, and reset crank 32, by a casing 34, from which all the elements described are suitably supported. The casing of course has suitable openings to allow the dial wheels 29 and 30 to be seen.

The apparatus, thus far described, is old and well known in the art and a more detailed description and illustration of it is unnecessary to an understanding of the present invention. Also, such apparatus may vary in form and arrangement,—the only requisites being a meter, a register driven by the meter and having resetting means, some means for forcing liquid through the meter and to the hose, a nozzle for the hose and a support therefor, together with some means for controlling the flow of liquid, usually but not necessarily in all cases, an electric switch for starting and stopping the pump motor.

In the first form of the invention, the switch is operated from outside the casing 34 by a lever 35 fixed to the outer end of a shaft 36. This shaft is rotatably mounted in a bracket 37, fixed as indicated in Fig. 2 to a cross bar 37', which forms part of the frame of the housing 34. The bracket 37 forms a support for the nozzle 23, the lower and horizontal portion of guard 26 resting on said support. Such portion is slotted (Figs. 2 and 5) to receive an upstanding lug 38 on support 37 and the lug is perforated to receive a padlock whereby the nozzle may be locked in its illustrated and inactive position, independently of the other nozzle locking means later to be described. The switch lever 35 has a lug 39 which, when the lever is turned in a counterclockwise direction from the position marked A (Fig. 2) to that marked B, will abut the guard 26 of the hose nozzle and prevent the switch lever from being moved to the full limit of its range of movement in this direction,—such limit being indicated as position C. A lug 40 (Fig. 1) on the lever 35 prevents it from being moved in a clockwise direction beyond the position A shown in Fig. 2. The inner end of shaft 36 has fixed thereon an arm 41 which is connected by a link 42 (bearing a weight 43) to an arm 44 fixed on the shaft 45 of the switch. When the parts occupy the positions shown in Fig. 2, the motor switch is open. The lever 35 may, however, be moved while the nozzle 23 is on support 37 to position B, which is far enough to close the motor switch. When the lever 35 has been turned into position B the motor and pump will be operated but the lever must be manually held in this position. If the operator releases lever 35, the weight 43 will move the parts to position A and automatically open the motor switch. When the nozzle 23 is removed from its support, lever 35 may be moved into the position C. The parts then occupy the positions shown in Fig. 3, and the axis of the pivotal connection between link 42 and lever 41 lies to the left of a vertical plane passing through the axis of shaft 36. Hence, the weight 43 will then tend to move the lever 35 in a counterclockwise direction but such movement is limited by a stop 46 fixed to the bracket 37. Thus, the switch will be held in closed position so that the pump motor may be continued in operation without manual attention by the operator. To enable the additional movement of lever 35 in a counterclockwise direction after the switch has been closed the link 42 is made in two relatively movable sections,—the lower forked end 42' being slidable on the other portion. A spring 47 coiled on the lower end of link 42 acts between a collar 48 fixed on such end, and the upper end of fork 42' to hold the parts in the positions illustrated, wherein a nut 49 on the link 42 abuts fork 42'. However, the spring will yield to allow link 42 to be drawn up after the switch is closed. When the nozzle 23 is replaced on its support, the lever 35 has to be moved in a clockwise direction, out of interfering relation therewith and, when moved thus far, the weight 43 will come into play to move the lever back into the position shown in Fig. 2 in which the switch is open.

This invention provides a means for locking the nozzle on its support unless and until the register 28 has been reset to zero. Such means are contained for the most part in a casting 50 which is suitably secured to a cross bar 51 (Fig. 1) forming part of the frame of housing 34. The upper part of this casting has two spaced ears 52 which rotatably receive one end of the resetting shaft 31. Casting 50 (Figs. 5 and 6) has a chamber 53 in one face opening adjacent a side wall of casing 34. Mounted to turn in this casting and extending horizontally across the chamber is a shaft 54. Fixed to this shaft, near one end, is a finger 55 which extends through a slot 75 in the casing 34 and is adapted to enter a hole 56 in the vertical part of the guard 26 of the hose nozzle. Fixed to shaft 54, near the other end, is an arm 57, the outer free end of which is slotted to receive a pivot pin 58, fixed in the lower end of a fork 59. The fork is fixed to a rod 60, vertically slidable in the casting 50 and extending above its upper end into the space between the ears 52 and in position to engage a disk 61, fixed to the reset shaft 31. This disk has a single notch 62 in its periphery and the notch is large enough to receive the upper end of rod 60. The reset shaft 31 is intended to be turned one complete revolution in order to reset the register 28. At the start and at the end of this resetting operation, the disk 61 is positioned as in Fig. 6 so that rod 60 can freely enter notch 62 and thus allow shaft 54 to turn, provided its lock, to be described, has been released. However, should one start to reset the register and not turn shaft 31 the intended complete revolution, then disk 61 will be turned to some intermediate position in which notch 62 will be out of line with rod 60. Then the rod 60, if lifted, will abut the periphery of disc 61 and prevent movement of shaft 54 and finger 55 to a degree sufficient to enable removal of the nozzle from its support. While rod 60 is always free to rise a certain amount and thus enables the nozzle 23 to be lifted vertically, it cannot be lifted far enough to enable the removal of nozzle 23, for which purpose the guard 26 must be lifted above lug 38.

The normal locking device for the hose nozzle includes a cam 63, fixed to shaft 54 and having a shoulder 64 which is adapted, as shown in Fig. 7, to abut one end of a locking bar 65, if the finger 55 is lifted to any great extent. Particularly, the finger is locked against vertical movement to an extent sufficient to allow removal of nozzle 23 from its support. The bar 65 is pivoted intermediate its ends on a stud 66 fixed to casting 50 and a spring 67 tends to force the right-hand end of the bar downwardly against the peripheral part of cam 63 which lies back of shoulder 64 (to the left as viewed in Fig. 7). The left-hand end of bar 65 supports the lower end of a vertical rod 68, slidably mounted in casting 50 and having its upper end disposed in the path of a cam 69 fixed on shaft 31. Thus, the locking bar may be released by turning reset shaft 31, by means of crank 32, through one revolution, which will cause cam 69 to depress rod 68 and force the right-hand end of bar 65 upwardly out of the path of shoulder 64 or into the position shown in Fig. 9.

When the locking bar 65 has been lifted, as just described, it is held with its right-hand end elevated above cam 63 by a segment 70 in the manner shown in Figs. 9 and 10. This segment is mounted to turn freely on shaft 54 and is held against axial displacement on the shaft between the hub of cam 63 and a washer 71, which in turn is held in place by a pin 72. A spring 73 tends to turn segment 70 in a clockwise direction as viewed in Figs. 7 and 10. Hence, when the right-hand end of bar 65 is raised, as above described, the segment will be moved by spring 73 from the position shown in Fig. 7 to that shown in Fig. 10, wherein the segment 70 abuts a lug 74 on cam 63 and thus its clockwise movement is arrested. Clockwise movement of cam 63 is prevented by the abutment of finger 55 with the bottom of the slot 75 in the casing 34 (Fig. 5.)

When the finger 55 has been unlocked, it is free to swing in a counter-clockwise direction, and the nozzle 23 can be lifted vertically to a position wherein the horizontal portion of the guard 26 clears the top of lug 38, after which the nozzle is swung outwardly from casing 34 to withdraw the vertical portion of the guard 26 from finger 55. As the finger 55 is moved upwardly by the removal of the nozzle from its support, it turns cam 63 and the lug 74 thereon moves segment 70 backwardly out of supporting relation with the bar 65. The peripheral supporting surface of segment 70 is of slightly greater radius than the peripheral surface of cam 63. Consequently, as the segment 70 is moved from in under bar 65, the latter drops slightly, as will be clear from Fig. 13, so that if one then attempts to move finger 55 or cam 63 clockwise, the segment will be held from moving clockwise with the cam. Then, as the cam 63 is thus moved, the bar 65 is forced into the position shown in Fig. 7, thus locking the finger 55 until the reset shaft 31 is again operated.

The right hand end of bar 65 slides over an abutment 76 formed on casting 50, which prevents deflection of the bar by pressure of the cam on it if one attempts to force finger 55 upwardly when it is locked.

The operation will be briefly summarized. Normally, the hose nozzle 23 rests upon its support; the switch lever 35 is held in "off" position by the weight 43; and usually the register 28 is not reset and the dials 29 and 30 are left showing the result of the previous dispensing operation. Assuming these conditions, the parts are positioned as shown in Figs. 1, 2, 5, 6 and 7. The notch 62 of disc 61 will be positioned to receive rod 60, as shown in Fig. 6. The finger 55 will be locked by the bar 65 engaging in back of shoulder 64 of cam 63 as shown in Fig. 7. The nozzle 23 will thus be locked to its support. Lever 35 can be moved counterclockwise from the position A to position B shown in Fig. 2 far enough to turn on the switch of the pump motor and the latter can then be operated but the operator must manually hold the switch lever raised. If he releases it, the weight 43 will automatically move the switch to open position. To maintain the switch closed, without manual effort, lever 35 must be moved to the position C and this is possible only after nozzle 23 is removed from its support. Before this can be done, the nozzle must be unlocked and an operation of the reset shaft 31 is necessary for this purpose, whereby resetting of the register is insured. It is necessary to turn the reset shaft 31 one full revolution from the position shown in Fig. 6 in order to restore the dials of the register 28 to zero position and "clear" the register. When the shaft 31 is thus turned, the notch 62 will again be positioned for entrance of rod 60. But if the shaft 31 is turned less than one revolution, the rod 60 will prevent removal of nozzle 23. It will abut disc 61 and thus prevent turning of shaft 54 to an extent sufficient to release the nozzle 23. The operation of shaft 31 will cause cam 69 to raise bar 65 into the position shown in Figs. 9 and 10 in which it is held by segment 70. The locking finger 55 is now free to swing upwardly and the nozzle 23 may be lifted far enough to be removed. The removal of the nozzle turns finger 55 and shaft 54, lifting rod 60 into the notch 62 and locking the resetting shaft against operation. Also, the cam 63 will move back the segment 70 into the position shown in Fig. 13 in readiness for a succeeding operation. With the nozzle 23 removed from its support, lever 35 may now be turned to the position C in which the weight 43 will act, as shown in Fig. 3, to hold the motor switch in closed position. The usual dispensing operation now ensues, the quantity and cost of the liquid dispensed being shown by the dials 29 and 30 of register 28 in the usual way. When the dispensing operation has been completed the operator replaces the nozzle 23 on its support but, before he can do this, lever 35 must be moved in a clockwise direction to such an extent that weight 43 will move the motor switch to the "off" position A shown in Fig. 2. The nozzle can then be replaced on its support by first inserting its discharge end in the socket 77 (Fig. 1) provided in the pump casing and swinging it, while held slightly elevated above support 37 into the position shown in Fig. 11, allowing the then raised locking finger 55 to enter the hole 56 in the guard 26 of the nozzle. Then, with the parts positioned as in Fig. 11, the nozzle is lowered until it rests on its support 37. As the nozzle is lowered, the upper wall of hole 56 will engage the finger 55 and swing it downwardly. The parts are now positioned as in Fig. 5. The finger 55 has been depressed and cam 63 has been moved back into the position shown in Fig. 7 so that the locking bar 65 has been moved back into locking position. The nozzle thus becomes automatically locked to its support and cannot be released until shaft 31 has again been turned one complete revolution, causing the register to be fully reset.

A modification of the invention is shown in Fig. 4. Here exactly the same nozzle locking means are used as have been above described.

The essential difference is that switch lever 35', which is shown in "off" position, cannot be moved in a counterclockwise direction to "on" position because of the abutment of a lug 39' with the guard 26 of nozzle 23. Removal of the nozzle from support 37 will, of course, permit lever 35' to be turned to "on" position. Or, and as herein illustrated, the nozzle 23 may be lifted vertically far enough to permit lug 39' to pass beneath the lower portion of the nozzle guard and yet not far enough to enable such portion to clear the top of the lug 38', which has been made somewhat higher than lug 38 for this reason. Freedom for the necessary limited vertical movement of nozzle 23 may be had by the lost motion provided in the locking device (between shoulder 64 and bar 65) and/or that provided by the hole 56 in the guard 26 of nozzle 23. In this modification, the weight 43 is omitted and the switch lever 35' is manually moved in both directions.

Another modification is shown in Fig. 14. Here again, the same nozzle-locking means are used. Also a fixed support 80 secured to bar 51, is used for the nozzle 23,—the support having an upstanding lug 81, high enough to allow the nozzle 23 to be lifted to a limited extent, as it was in the form shown in Fig. 4 without releasing the nozzle-locking means and without completely disengaging the guard 26 from the lug 81. Alongside the hose support 80 is a switch operating lever 82, pivoted intermediate its ends at 83 to support 80 and having its rear end connected by a link 84 to the lever 44 of the motor switch. The outer end of lever 82 is engaged by the guard 26 of nozzle 23. When the nozzle 23 is placed on support 80, its weight moves lever 82 to the illustrated position in which the switch is opened. The arrangement here is such that the nozzle 23 may be lifted far enough, without unlocking it and without releasing it from lug 81, to enable lever 82 to be moved, manually or otherwise, upwardly far enough to close the motor switch. Here again, the operator has to manually maintain the switch in closed position by holding the weight of the nozzle off the lever. The moment he releases the nozzle, its weight bears on lever 82 and moves it to open the switch.

In all three forms of the invention the nozzle is locked against removal from its support by means which are releasable only after the register has been reset to zero. And in all three forms of the invention operation of the pump is possible before the register has been reset to zero. It is possible also to force gasoline through the meter in the not infrequent cases when the visible discharge indicator 22 is not completely filled, and in fact the necessity of replenishing such indicator is one of the reasons for the development of this invention. Obviously, the indicator 22 if it needs filling should be filled prior to the resetting of the register. To fill it afterward, as has heretofore been done, results in the registration of the quantity used for replenishment on the dials of the register. The quantity shown on the register will be greater than that secured by the customer and the customer will have been cheated. With this invention, the pump may be operated enough to replenish the indicator 22 and the resetting of the register effected afterward. The fact that the motor and pump may be operated before the register has been reset leads to no fraud on the customer because the nozzle 23 is locked to its support and cannot be inserted in the tank of the customer's car. And before the nozzle can be unlocked and removed, the register must be reset to zero. The arrangement is thus a better one than that which has heretofore been proposed and which is characterized by the prevention of operation of the pump and motor unless and until the register has been reset to zero.

It is possible also to force gasoline out of the nozzle 23 previous to resetting of the register. The valve lever 25 may be, and often is, slotted, as shown at 86 in Fig. 5, so that it can clear the lug 38,—thus enabling the lever to be moved to open the nozzle valve while the nozzle is in place on its support. Thus, by pressing lever 25 toward the nozzle body and at the same time operating the switch lever 35, gasoline can be forced out of the nozzle. Naturally, this is a useless operation but, even if such a foolish operation is performed, the service station owner and not the customer will be cheated. The nozzle still remains locked to its support and unless and until it is removed, the customer well knows that he isn't getting any gasoline even though he observes the dials of the register moving and sees the flow of gasoline in the indicator 22. And the removal of the nozzle compels as a prerequisite the resetting of the register to zero.

The invention thus affords a better and more effective means for insuring a cleared register just prior to a dispensing operation and for protecting the customer against dishonest service station attendants who attempt to cheat the customer by fraudulent manipulation of the apparatus.

What we claim is:

1. In a liquid dispensing apparatus, a conduit terminating with a flexible hose having a nozzle, a meter interposed in said conduit, means for forcing liquid through said conduit and meter, a register driven by the meter and having resetting mechanism, an operating member for said mechanism movable in cycles and effective in one cycle of movement to reset the register, a support for the nozzle when not in use, means engageable by the nozzle in the act of placing the latter on its support and effective whether or not the register has been reset to automatically lock the nozzle to the support, and means dependent on an operation of said operating member through one complete cycle to release said locking means.

2. In a liquid dispensing apparatus, a conduit terminating with a flexible hose having a nozzle, a meter interposed in said conduit, means for forcing liquid through said conduit and meter, a register driven by the meter and having resetting mechanism, an operating member for said mechanism movable in cycles and effective in one cycle of movement to reset the register, a support for the nozzle when not in use, means engageable by the nozzle in the act of placing the latter on its support to automatically lock the nozzle to the support, releasing means for said locking means operable by movement of said operating member at an intermediate point in its cycle of movement, and additional means operable to lock the nozzle against removal from said support during movement of said operating member and to release it only at the end of the cycle of movement thereof.

3. In a liquid dispensing apparatus, a conduit terminating with a flexible hose having a nozzle, a meter interposed in said conduit, means for forcing liquid through said conduit and meter, a register driven by the meter and having resetting mechanism, a shaft rotatable from a predetermined initial position through one revolution and effective during such revolution to operate said mechanism and reset said register, a support for the nozzle when not in use, a locking finger engageable and movable by the nozzle from a first to a second position in the act of placing the nozzle on its support, a member automatically operable to lock said finger in its second position, and means operable by rotation of said shaft to move said member and release said finger.

4. In a liquid dispensing apparatus, a conduit terminating with a flexible hose having a nozzle, a meter interposed in said conduit, means for forcing liquid through said conduit and meter, a register driven by the meter and having resetting mechanism, a shaft rotatable from a predetermined initial position through one revolution and effective during such revolution to operate said mechanism and reset said register, a support for the nozzle when not in use, a locking finger engageable and movable by the nozzle from a first to a second position in the act of placing the nozzle on its support, a member automatically operable to lock said finger in its second position, means operable by rotation of said shaft to move said member and release said finger, and means on said shaft to prevent movement of said finger into said first position even though said finger be released unless and until said shaft has been moved into said initial position.

5. In a liquid dispensing apparatus, a conduit terminating with a flexible hose having a nozzle, a meter interposed in said conduit, a register actuated by the meter, means for resetting the register, means for forcing liquid through said conduit and meter; a support for said nozzle when not in use, means for locking the nozzle to said support, a control member for stopping said liquid forcing means, said member movable from a first position in which the liquid forcing means is stopped into a second position and beyond the second position into a third position, said member effective in both said second and third positions to start said liquid forcing means, and means for automatically moving the control member from the second to the first position, and means for holding the member when moved into said third position against return movement by said automatic means into said first position, said member mounted to move adjacent said support and, said nozzle when in place on said support projecting beyond the support into the path of movement of the control member from the second to third positions.

6. In a liquid dispensing apparatus, a conduit terminating with a flexible hose having a nozzle, a meter interposed in said conduit, a register actuated by the meter, means for resetting the register, means for forcing liquid through said conduit and meter; a support for said nozzle when not in use, means for locking the nozzle to said support, and a pivoted control member for stopping and starting said liquid forcing means mounted adjacent said support and adapted to be engaged by the nozzle when placed on said support and moved by the nozzle into position to stop said liquid forcing means, said nozzle when locked to said support capable of being lifted far enough to enable the control member to be moved into position to start said liquid forcing means.

7. In a liquid dispensing apparatus, a conduit terminating with a flexible hose having a nozzle, a meter interposed in said conduit, a register actuated by the meter, means for resetting the register, means for forcing liquid through said conduit and meter; a support for said nozzle when not in use, means for locking the nozzle to said support, and a control member for said liquid forcing means mounted adjacent said support, said member being movable from a first to a second position and back again to respectively start and stop said liquid forcing means, said nozzle when in place on said support projecting beyond the support into the path of movement of said member and blocking movement of said member into said second position, said nozzle and its locking means constructed with sufficient play therebetween to enable the nozzle to be manually liftable while locked to said support enough to enable said member to be moved into said second position.

8. In a liquid dispensing apparatus, a conduit terminating with a flexible hose having a nozzle, a meter interposed in said conduit, a register actuated by the meter, means for resetting the register, electrically actuated pumping means for forcing liquid through said conduit, a switch for starting and stopping the said pumping means, a support for said hose nozzle when not in use, an operating lever for said switch manually movable from "off" position to "on" position while the nozzle is on said support, means for automatically returning said lever when released to "off" position, said lever being movable beyond its normal "on" position into an extreme "on" position, means for automatically holding said lever in said extreme "on" position against return movement by said automatic means to "off" position, said nozzle when in place on said support projecting beyond the support into the path of movement of said lever from its normal to its extreme "on" position and preventing such movement, means automatically operable when the nozzle is placed on said support to lock it thereto, and means actuated by said resetting means to release said nozzle locking means.

9. In a liquid dispensing apparatus, a conduit terminating with a flexible hose having a nozzle, a meter interposed in said conduit, a register actuated by the meter, means for resetting the register, means for forcing liquid through said conduit and meter; a support for said nozzle when not in use, means automatically operable by the placing of the nozzle on said support to lock the nozzle against removal therefrom, and means dependent on an actuation of said resetting means for releasing said nozzle locking means.

10. In a liquid dispensing apparatus, a conduit terminating with a flexible hose having a nozzle, a meter interposed in said conduit, a register actuated by the meter, means for resetting the register, means for forcing liquid through said conduit and meter, a support for said nozzle when not in use, means for locking the nozzle to said support, means actuated by said resetting means for releasing the nozzle locking means when said register has been reset, and means operable when the nozzle is unlocked and moved from its support to prevent operation of said resetting means.

11. A dispensing apparatus including a hose and nozzle and means for moving fluid therethrough, a meter for the quantity dispensed and means for indicating the same, resetting devices for the indicating means, a nozzle hook, a latch for holding the nozzle on said hook, and means controlled by the resetting devices for maintaining said latch during resetting and releasing the same at the completion of resetting.

12. A dispensing apparatus including a casing, a hose and nozzle and means for moving fluid therethrough, a meter for measuring the quantity dispensed and means for indicating the same, resetting devices for the indicating means, a hook on said casing for supporting the nozzle, said casing having an aperture adjacent the hook into which the end of the nozzle may be extended, a latch for detaining the nozzle on the hook with its end in said aperture, and devices controlled by the resetting devices for maintaining the latch in holding engagement with the nozzle.

13. In a liquid dispensing apparatus, a conduit terminating with a flexible hose having a nozzle, a meter interposed in said conduit, a register actuated by the meter, resetting means for the register, means for forcing liquid through said conduit and meter, a support for said nozzle when not in use, means automatically operable by the placing of the nozzle on its support to lock the nozzle against removal from the support, means dependent on an actuation of said resetting means for releasing the nozzle locking means and means operable when the nozzle is unlocked and removed from its support to prevent operation of said resetting means.

14. In a liquid dispensing apparatus, a conduit terminating with a flexible hose having a nozzle, a meter interposed in said conduit, a register actuated by the meter, means for resetting the register, means for forcing liquid through said conduit and meter, a support for said nozzle when not in use, means for locking the nozzle to said support, control means for stopping and starting said liquid forcing means, an actuating lever, toggle links interconnecting said lever and control means, automatic means tending to move said lever into one extreme position in which said control means is effective to stop said forcing means, said lever being manually movable to a second position and beyond the latter to a third and extreme position in which second and third positions said control means is effective to start said forcing means, said toggle links operable when and only when said lever is moved into the third position to hold it there against the action of said automatic means, said lever mounted adjacent said support and movable from the first to the second position while the hose nozzle is on said support, said nozzle when on said support interfering with movement of said lever to said third position.

JOSEPH A. LOGAN.
WARREN H. DE LANCEY.